United States Patent
Kanekar et al.

(10) Patent No.: US 12,225,394 B2
(45) Date of Patent: Feb. 11, 2025

(54) FACILITATING COLLECTION OF EVENTS DETECTED BY RADIO ACCESS NETWORK COMPONENTS

(71) Applicant: Microsoft Technology Licensing, LLC, Redmond, WA (US)

(72) Inventors: Bhushan Mangesh Kanekar, Bellevue, WA (US); Prateek Mittal, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 335 days.

(21) Appl. No.: 17/749,081

(22) Filed: May 19, 2022

(65) Prior Publication Data
US 2023/0403581 A1    Dec. 14, 2023

(51) Int. Cl.
*H04W 24/08* (2009.01)
*H04L 67/10* (2022.01)

(52) U.S. Cl.
CPC ............. *H04W 24/08* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2009/0238090 A1* | 9/2009 | Sambhwani | H04W 28/16 370/252 |
| 2016/0353291 A1* | 12/2016 | Tarlazzi | H04W 52/42 |
| 2017/0005886 A1* | 1/2017 | Dade | H04L 43/04 |
| 2019/0319863 A1* | 10/2019 | Gupta | H04W 24/04 |
| 2021/0385682 A1 | 12/2021 | Bedekar et al. | |
| 2022/0377577 A1* | 11/2022 | Radunovic | H04W 16/22 |

OTHER PUBLICATIONS

"International Search Report and Written Opinion Issued in PCT Application No. PCT/US23/012980", Mailed Date: May 15, 2023, 17 Pages.

* cited by examiner

*Primary Examiner* — Kenneth B Wells
(74) *Attorney, Agent, or Firm* — Ray Quinney & Nebeker; James Bullough

(57) ABSTRACT

The present disclosure relates to systems, methods, and computer-readable media for collecting operational data across a plurality of radio access network (RAN) components. For example, the systems described herein can identify data signals that are tracked by one or more RAN components. Based on these data signals, the systems can define any number of network events that may be tracked by event tracking agents that are deployed on each of the RAN component(s). The RAN components may then provide a stream of event instances to the systems for collecting, analyzing, and otherwise utilizing the network event data that is locally tracked by the respective RAN components.

20 Claims, 7 Drawing Sheets

FACILITATING COLLECTION OF EVENTS DETECTED BY RADIO ACCESS NETWORK COMPONENTS

BACKGROUND

Cellular networks can provide computing devices (e.g., mobile devices) with access to services available from one or more data networks. A cellular network is typically distributed over geographical areas that often include base stations, core networks, and/or edge networks that collectively provide a variety of services and coverage to end-user devices (e.g., mobile devices). The devices of the cellular network provide reliable access to a data network by mobile devices over a wide geographic area. In many instances these cellular networks provide mobile devices access to the cloud.

As noted above, cellular networks include a number of network components. For example, cellular networks often include radio access network (RAN) components, edge network components, and core network components. In many instances, the RAN may include base stations having components thereon that communicate wirelessly with user devices (e.g., mobile devices or other endpoints) and facilitate interaction with other components of a core network and/or cloud computing system.

In many cellular environments, RAN components are hosted or otherwise operated by different entities than other components within the cellular network. For example, RAN components are often maintained and operated by cellular carriers or other vendors while core network, edge network, and cloud computing components are maintained and operated by other entities. Due to the non-uniform ownership and management of the different components, there are often difficulties in determining which of the various components are failing or underperforming in connection with different applications. For example, while individual components may locally track data for internal use, this data is typically not shared between different devices of the cellular environment. Moreover, where RAN components at different sites (e.g., at different base stations) are often owned by different vendors altogether, tracking and diagnosing network failures and other problems becomes increasingly complex and difficult.

These and other problems exist in connection with collecting operational data and diagnosing network performance in a cellular network, and particularly in connection with RAN components on the cellular network.

DETAILED DESCRIPTION

Figure 1:
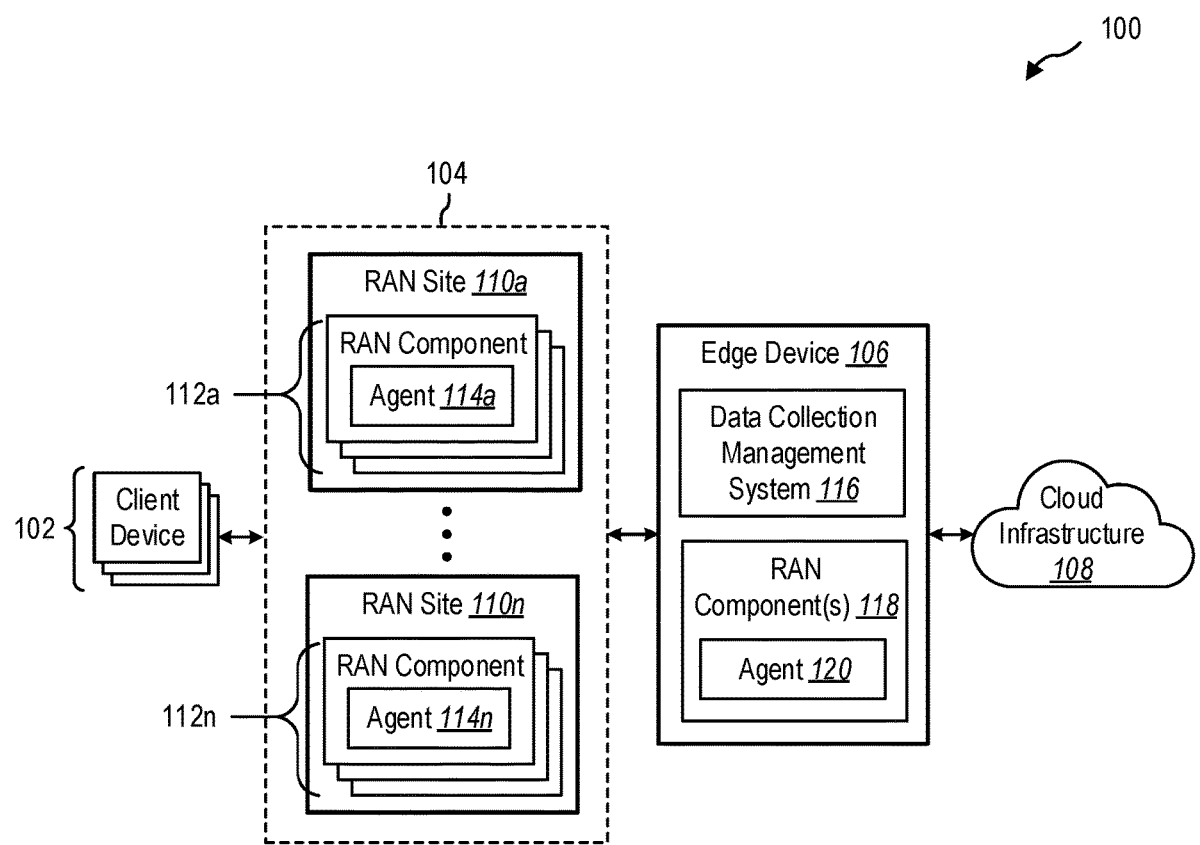
FIG. 1 illustrates an example environment including a data collection management system in accordance with one or more embodiments.

The present disclosure relates generally to systems, methods, and computer-readable media for managing collection of operational data across a plurality of radio access network (RAN) components. In particular, the present disclosure involves implementing event detection agents on RAN components of a cellular network that include instructions deployed thereon for detecting various network events (or simply "events"). More specifically, the systems described herein involve deploying event detection agents having instructions deployed thereon that enable the RAN components to locally detect events based on data signals observed by the RAN components with respect to network communication packets that are transmitted over the cellular network. As will be discussed herein, these events may be accumulated on a data collection management system and analyzed for various purposes by a wide variety of cloud-based services.

As an illustrative example, the data collection management system may be deployed on an edge network or other portion of a cloud computing system. In one or more implementations, the data collection management system may receive a set of data signals tracked by a RAN component (e.g., a physical RAN component or a virtualized RAN component). Based on the set of data signals, the data collection management system may cause an event detection agent to be deployed on the RAN component. The event detection agent may have a set of instructions deployed thereon for detecting a plurality of network events based on one or more of the data signals. Upon deployment of the event detection agent, the data collection management system may receive a stream of locally tracked event instances detected by the event detection agent in accordance with the deployed set of instructions.

As will be discussed in further detail below, the present disclosure includes a number of practical applications having features described herein that provide benefits and/or solve problems associated with observing various network events and collecting operational data across a plurality of RAN components. Some example benefits are discussed herein in connection with various features and functionalities provided by a data collection management system. It will be appreciated that benefits discussed herein in connection with one or more embodiments are provided by way of example and are not intended to be an exhaustive list of all possible benefits of the data collection management system.

For example, by deploying an event detection agent on each of multiple RAN components, the data collection management system enables each of any number of RAN components to locally detect specific events and provide a stream of the identified events to one of a variety of services on a cloud computing system. This local implementation of the event detection agents provides a scalable approach to detecting various events across multiple geographic sites, as well as across multiple RAN components within respective sites. Moreover, where certain RAN components are virtual implementations on an edge network or other portion of a cloud computing system, the event detection agents may provide even further flexibility with respect to locally detecting a wide variety of events on various RAN components.

The data collection management system can additionally deploy event detection agents having different sets of instructions thereon to be configured for respective types of RAN components. Indeed, the data collection management system may deploy different sets of instructions to different types of RAN components based on unique capabilities of the RAN components and/or based on unique sets of data signals that are provided (e.g., published) by the respective RAN components. This allows for flexibility in tracking different types of network events at different RAN components. This also allows flexibility in tracking events across different RAN components that provide different sets of data signals.

This deployment of event detection agents having different sets of instructions can further provide additional tracking capabilities across RAN components at different sites that are hosted by different vendors. Indeed, even where different RAN sites have different types of hardware, the data collection management system can cause the event detection agents to be deployed on any RAN component for which the data collection management system receives permission to deploy the event detection agent(s) thereon. In addition, as will be discussed in connection with one or more embodiments herein, the data collection management system can normalize the instructions across different RAN sites to enable the data collection management system to collect similar types of data, even where the different vendors or RAN sites publish different sets of data signals.

Another benefit that the data collection management system provides is the capability to modify instructions for detecting network events across a large number of RAN components. For example, the data collection management system may easily update event thresholds, indicate different combinations of data signals that constitute a particular event, or otherwise modify the instructions for detecting events across any number of RAN components. This can be done on a large scale across specific RAN types and/or across multiple sites of RAN components. This provides incredible scalability across any number of RAN sites that are connected to a specific edge network or even across RAN sites that are simply in communication with the cloud computing system.

Each of the above benefits may also be provided without interrupting normal operations of the RAN components. For example, the event detection agent may simply constitute an application programming interface (API) having a set of instructions deployed thereon that enables the event detection agent to simply observe network events and provide an indication of a particular event as it occurs. This can be provided via a data stream to the data collection management system (or other cloud-based service) without causing significant processing overhead on the RAN component(s). Indeed, as will be discussed herein, the event detection agent may simply leverage the data signals that the RAN component is already known to track and simply observe the normal operation of the RAN component to detect the various network events.

As illustrated in the foregoing discussion and as will be discussed in further detail herein, the present disclosure utilizes a variety of terms to describe features and advantages of methods and systems described herein. Some of these terms will be discussed in further detail below.

As used herein, a "cloud computing system" refers to a network of connected computing devices that provide various services to computing devices (e.g., customer devices). For instance, as mentioned above, a distributed computing system can include a collection of physical server devices (e.g., server nodes) organized in a hierarchical structure including clusters, computing zones, virtual local area networks (VLANs), racks, fault domains, etc. In one or more embodiments described herein a portion of the cellular network (e.g., a core network) may be implemented in whole or in part on a cloud computing system. Moreover, in one or more embodiments a data network may be implemented on the same or on a different cloud computing network as the portion of the cellular network.

In one or more embodiments, the cloud computing system includes one or more edge networks. As used herein, an "edge network" may refer to an extension of the cloud computing system located on a periphery of the cloud computing system. The edge network may refer to a hierarchy of one or more devices that provide connectivity to devices and/or services on a datacenter within a cloud computing system framework. An edge network may provide a number of cloud computing services on hardware having associated configurations in force without requiring that a client communicate with internal components of the cloud computing infrastructure. Indeed, edge networks provide virtual access points that enables more direct communication with components of the cloud computing system than another entry point, such as a public entry point, to the cloud computing system.

As used herein, a "RAN component" may refer to any device or functional module that provides radio access functionality on a cellular network. RAN components may refer to physical components implemented at a RAN site, such as a base station or set of co-located base stations. RAN components may also refer to virtualized components, such as a service instance deployed on an edge network or datacenter of a cloud computing system. By way of example and not limitation, RAN components may refer to routers, firewalls, antennas, or any device or other functional component (e.g., a virtualized service) that facilitates a connection between an endpoint (e.g., a user device, such as a cell phone) and a core network.

As noted above, and as will be discussed in further detail below, a RAN component may track or otherwise collect data signals. As used herein, a "data signal" may refer to one or more pieces of operational data observed or otherwise detected by a RAN component in connection with one or more communication packets (or simply "communications") that are transmitted to or from an endpoint. A data signal may include any information in connection with a communication, such as a device identifier or subscriber identity module identifier (SIM ID), a timestamp, a site identifier, a geographic location, other communication characteristics, or any other information that can be obtained from a communication to or from a client device. As will be discussed below, different RAN components may detect or otherwise track different sets of data signals depending on capabilities of the RAN component(s).

As used herein, a "network event" or simply "event" may refer to a set of one or more data signals that have been defined as a particular occurrence. For example, an event may refer to a specific data signal or combination of multiple data signals that, when observed, constitute an associated network event. In one or more embodiments, an event may refer to any detected data signal that is defined as an event, such as a detected SIM ID, timestamp, site identifier, etc. In one or more implementations, an event may refer to a defined combination of data signals, such as a dropped call or a failed communication. In one or more embodiments, an event may refer to a trigger or observed threshold, such as a threshold number of dropped calls or failed communications, or a detected bandwidth that surpasses a high threshold over some period of time. Indeed, a network event may refer to any combination of any number of data signals that may be defined by a set of instructions that are deployed on an event detection agent.

As used herein, an "event detection agent" (or simply "agent") refers to a service or interface deployed on a RAN component that is configured to detect a network event. In one or more embodiments, an event detection agent refers to a software agent capable of observing data signals tracked by a RAN component and determining whether the observed data signals constitute various events. As noted above, in one or more implementations, the event detection agent includes an API that provides a mechanism whereby the event detection agent can transmit a data stream including any indicated events observed on the RAN component. As will be discussed in further detail herein, the event detection agents deployed on different RAN components may include similar or different sets of instructions for detecting the same or different network events. The specific events detectable by a given event detection agent may be based on a corresponding set of data signals that are published or otherwise provided by a corresponding RAN component.

Additional detail will now be provided regarding systems described herein in relation to illustrative figures portraying example implementations. For example, FIG. 1 illustrates an example environment 100 for implementing features and functionality of a data collection management system in accordance with examples described herein. As shown in FIG. 1, the environment 100 illustrates example portions of a cellular network including a set of client devices 102, a radio access network 104 (or simply RAN 104), an edge device 106, and an internal cloud infrastructure 108. These components 102-108 may collectively form a public or private cellular network, which may include a RAN, a core network, and a data network. Moreover, any portion(s) of the cellular network may be implemented on a cloud computing system inclusive of the edge device 106 (and other edge devices) and the cloud infrastructure 108 (e.g., a cloud datacenter).

As further shown in FIG. 1, the RAN 104 may include a plurality of RAN sites 110a-n. Each RAN site may include a plurality of RAN components 112a-n and agents 114a-n (e.g., event detection agents) deployed thereon. For example, a first RAN site 110a may include a plurality of RAN components 112a (e.g., physical RAN components) having a first set of agents 114a deployed thereon. Each of the additional RAN sites may include similar RAN components and agents deployed thereon. The RAN sites 110a-n may refer to RAN components 112a-n implemented at respective geographic sites. Further, the agents 114a-n may refer to event detection agents having varying sets of instructions deployed thereon.

As noted above, the environment 100 may include an edge device 106. As shown in FIG. 1, the edge device 106 may include a data collection management system 116 implemented thereon. The data collection management system 116 may perform various features described herein in connection with deploying the agents across different RAN components as well as deploying and updating instructions for the respective agents. Moreover, the data collection management system 116 may perform acts related to collecting operational data by receiving and compiling event streams from the different RAN components. Furthermore, the data collection management system 116 may cause the operational data to be stored, analyzed, or utilized in a variety of ways by services of on the edge device 106 and/or cloud infrastructure 108. Additional information in connection with the data collection management system 116 will be discussed below in connection with further examples.

As shown in FIG. 1, the edge device 106 may include one or more RAN component(s) 118 deployed thereon. The RAN component(s) 118 may refer to virtualized RAN components that are implemented in the form of cloud computing services. As a non-limiting example, the RAN component(s) 118 could be a firewall, load balancer, a filter, or any other cloud-based RAN service or microservice that enhances features and functionality of the RAN 104.

As shown in FIG. 1, the virtualized RAN component(s) 118 may include an agent 120 implemented thereon. Similar to the agents 114a-n on the physical RAN components 112a-n, the agent 120 on the RAN component(s) 118 may be configured with a set of instructions that define various network events and which facilitate locally identifying occurrence of various events and providing an event stream to the data collection management system 116. While not shown in FIG. 1, in one or more embodiments, the cloud infrastructure 108 may additionally include one or more RAN components and associated agents deployed thereon for detecting various events and providing an event stream of operational data to the data collection management system 116.

The client devices 102 may refer to a variety of computing devices or device endpoints including, by way of example, a mobile device such as a mobile telephone, a smartphone, a personal digital assistant (PDA), a tablet, or a laptop. Alternatively, one or more of the client devices 102 may refer to non-mobile devices such as a desktop computer, a server device (e.g., an edge network server), or other non-portable devices. In one or more embodiments, the client devices 102 refer more generally to any endpoint capable of communicating with devices on a cloud computing system, such as Internet of Things (IoT) devices, or other Internet-enabled devices. In one or more embodiments, the client devices 102 refer to applications or software constructs on corresponding computing devices. Each of the devices, including the client devices 102, edge device(s) 106, and other computing devices described herein may include features and functionality described generally below in connection with FIG. 6.

The RAN sites 110a-n may refer to base stations or other geographic RAN infrastructures that are hosted, administered, or otherwise maintained by a particular entity. For example, different RAN sites 110a-n may be maintained by a third-party vendor and may be implemented using different hardware having different specifications or data tracking capabilities. Thus, while specific examples are discussed herein in connection with specific RAN sites and specific RAN components, it will be appreciated that features described in connection with agents deployed on the respective RAN components are applicable to a wide variety of RAN sites and components. These features are applicable across different sites and components notwithstanding different protocols and different data signals that are obtained and tracked by the different RAN components. Indeed, as discussed in further detail herein, the data collection management system 116 provides features and functionality that overcome many difficulties caused by the non-uniform nature of the respective RAN sites 110a-n and RAN components 112a-n.

The edge device 106 may refer to one or multiple edge devices of an edge network. The edge device 106 may be implemented as part of a private or public network and may refer to a server rack (or multiple server racks) having computing nodes deployed on the edge of a cloud computing system. For example, the edge device 106 may refer to a server node (or one or more racks of server nodes) deployed at an edge location and having a virtual network connection with the cloud infrastructure 108.

As noted above, the features and functionality of the RAN components 112a-n, 118 and the data collection management system 116 may be utilized in a cellular network including, by way of example, a RAN, a core network, and/or a data network. In one or more embodiments, the cellular network is configured in accordance with a 4G standard and/or a 5G standard. Nevertheless, the data collection management system 116 may be implemented on any cellular network that relies on RAN components and which can utilize operational data that is tracked and received by the agents 114a-n deployed thereon.

Figure 2:
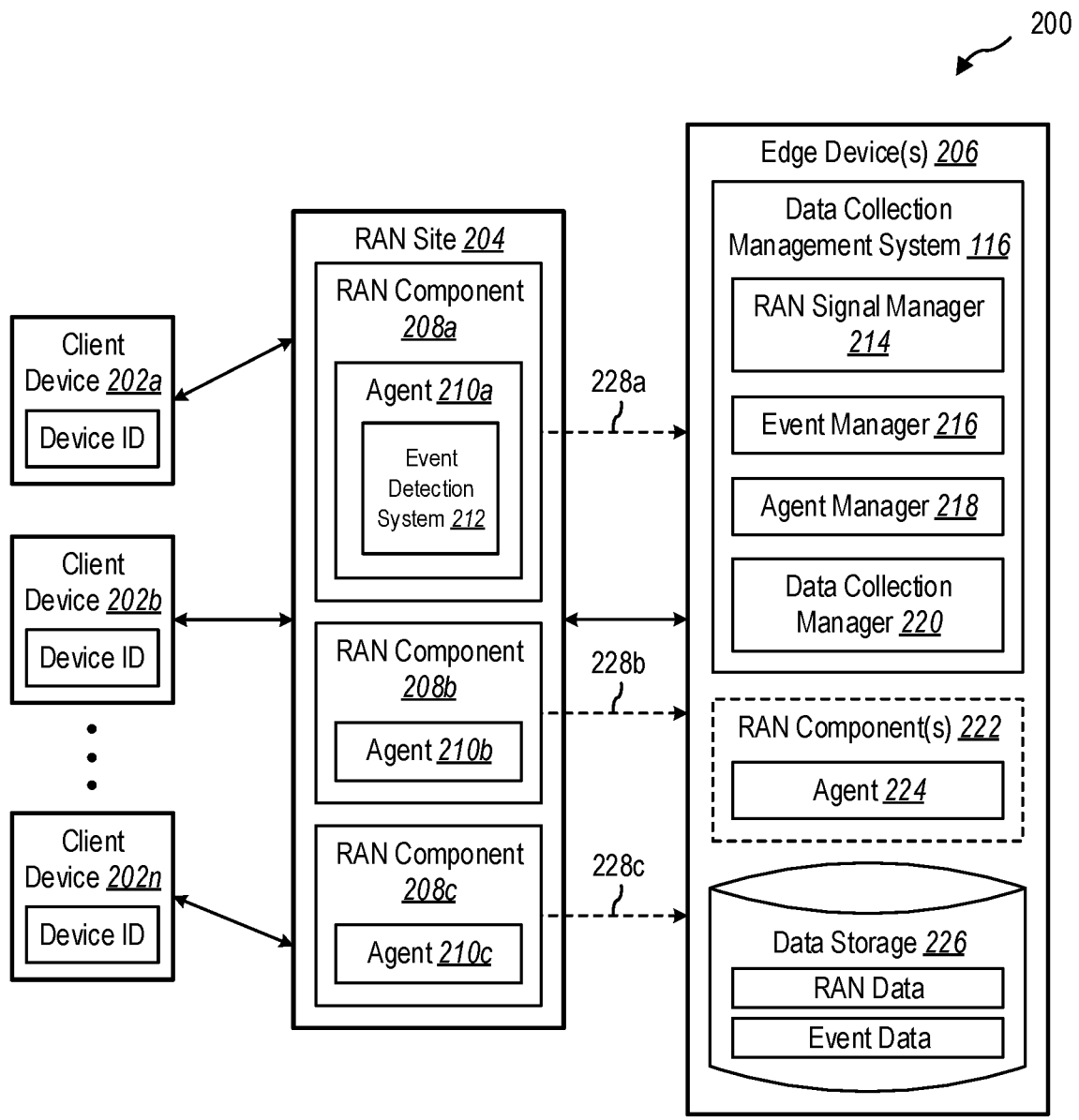
FIG. 2 illustrates an example environment showing implementation of a data collection management system on an edge network in accordance with one or more embodiments.

Additional detail will now be discussed in connection with a data collection management system 116 deployed on an edge device and in communication with a specific RAN site. For example, FIG. 2 illustrates an example environment 200 including a plurality of client devices 202a-n, a RAN site 204, and one or more edge devices 206 that are deployed as part of an edge network. The client devices 202a-n, RAN site 204, and edge device(s) 206 may be examples of similar components discussed above in connection with FIG. 1.

As shown in FIG. 1, the client devices 202a-n may include respective device identifiers that may be used to identify specific devices 202a-n in communication with the RAN site 204. For example, the device identifiers may refer to SIM IDs or other unique identifiers (e.g., global unique identifiers) associated with respective devices or hardware. As will be discussed below, the device identifiers may be associated with certain communications (e.g., network packets), which may be tagged or otherwise associated with detected events that are collected by the data collection management system 116. In the example shown in FIG. 2, the plurality of client devices 202a-n may refer to client devices that are within a proximity of the RAN site 204 such that communications originating from the respective client devices 202a-n are relayed or otherwise transmitted via the RAN site.

As shown in FIG. 2, the RAN site 204 includes a plurality of RAN components 208a-n deployed thereon. For ease in explanation, the RAN site 204 is shown to include three RAN components 208a-n having agents 210a-n deployed thereon. Nevertheless, the RAN site 204 may include any number of RAN components. Each of the illustrated RAN components 208a-n may refer to similar or different types of components. In addition, each of the agents 210a-n may include similar or unique sets of instructions thereon. For example, the first agent 210a may include an example set of event detection instructions 212 deployed thereon that configure the first agent 210a to detect various network events. The other agents 210b-c may include similar or different sets of instructions thereon.

Additional detail will now be given in connection with the data collection management system 116. For example, as shown in FIG. 2, the data collection management system 116 may include a plurality of components 214-220 for providing features and functionality of the data collection management system 116 herein. While certain components are described in connection with software or hardware modules implemented on a single edge device 206, it will be appreciated that one or more of the components 214-220 (or discrete functionalities of the respective components) may be implemented across a plurality of devices. For example, one or more components 214-220 of the data collection management system 116 may be implemented across multiple edge devices of an edge network. As another example, one or more components 214-220 may be implemented across a combination of edge devices and an internal cloud infrastructure.

As shown in FIG. 2, the data collection management system 116 includes a RAN signal manager 214. This RAN signal manager 214 may discover various tracking capabilities of the different RAN components 208a-c. More specifically, the data collection management system 116 may discover or otherwise obtain access to data signals that are tracked by the various RAN components 208a-c. As noted above, the data signals may be similar or different between the respective RAN components 208a-c.

The RAN signal manager 214 may obtain the data signals that are tracked by the RAN components 208a-c in a variety of ways. For example, in one or more embodiments, the RAN components 208a-c may broadcast, publish, or otherwise provide access to the various data signals that the RAN components 208a-c are configured to track or locally observe. In this example, the RAN signal manager 214 may periodically request access to or read publicly available data tracking capabilities of the RAN components 208a-c to determine the specific sets of data signals that the RAN components 208a-c are configured to track. In one or more embodiments, the tracking capabilities are accessible to any of a variety of devices. In one or more embodiments, the tracking capabilities are protected and only made accessible by requesting access from an operator of the RAN site 204.

The data collection management system 116 may further include an event manager 216. The event manager 216 may perform an act in connection defining or otherwise identifying events to be tracked by the agents 210a-c. This may involve identifying specific data signals or combinations of data signals to detect. In one or more embodiments, certain types of events may be important or key to track for all RAN components 208a-c. For example, the event manager 216 may define widely applicable events such as a count of network communications or communication packets, a count of failed communications (e.g., dropped packets), or common network conditions, such as an observed bandwidth.

In addition to common network events, the event manager 216 can device any number of events based on any combination of data signals that are tracked by the RAN components 208a-n. In one or more embodiments, the event manager 216 may modify a set of events under a variety of circumstances. For example, the event manager 216 may update event definitions based on new data signals that become available for a given RAN component (or RAN site). These new data signals may be a result of new components being installed on the RAN site that have additional capabilities or further specifications that facilitate definition of additional events. In one or more embodiments, a RAN component may simply be configured to track (or be given permission to track) additional data signals for a variety of reasons, which may prompt creation of additional events by the event manager 216.

With or without availability of additional data signals, further events may be defined by the event manager 216 (e.g., an administrator of the data collection management system 116). For example, a user, organization, or other entity may notice a spike in certain network failures under specific circumstances or during a specific period of time, which may prompt a desire to track certain events under the specific circumstances. In this example, the event manager 216 may receive or identify additional data signals or combinations of data signals to overserve and detect events that provide additional context and detail to the spike of network failures.

As noted above, the RAN components 208a-c may track similar and different sets of data signals. In one or more implementations, the RAN components 208a-c may track similar types of data signals that have different identifiers or slightly different protocols that pose difficulty in combining data originating from different RAN components 208a-c. In one or more embodiments, the event manager 216 may overcome this difficulty by normalizing the data signals. For example, where certain data signals are related, such as an identification of certain device types of different names or event different underlying functions (e.g., mobile device, IoT device), the event manager 216 may define events that normalize some of the differences in the respective data signals. For instance, where a data signal for a first RAN component indicates operational data tracked for a mobile device while another data signal for a second RAN component indicates operational data tracked for an IoT device, the event manager 216 may normalize this data in a number of ways. In one or more embodiments, the event manager 216 may normalize the data by indicating a broader category of device-type, such as a more general endpoint device.

As shown in FIG. 2, the data collection management system 116 additionally includes an agent manager 218. The agent manager 218 may cause the agents 210a-c to be deployed on the respective RAN components 208a-c. In deploying the agents 210a-c, the agent manager 218 may cause instructions to be deployed on the agents 210a-c. By way of example, a first agent 210a includes a set of event detection instructions 212 deployed thereon. Additional agents 210b-c may include a similar or unique set of event detection instructions thereon. The sets of instructions may be defined and updated over time by the event manager 216, as discussed above.

Thus, as shown in FIG. 2, the agent manager 218 may deploy agents 210a-c having instructions that are locally implemented on the RAN components 208a-c. These locally implemented instructions enable the agents 210a-c to locally detect various events defined by the instructions. As noted above, the agents 210a-c may track the events by simply leveraging data tracking capabilities that are being implemented on the RAN components 208a-c with or without the agents 210a-c. Indeed, because the agents 210a-c have event detection instructions that have been defined based on published or known data signals that the RAN components 208a-c are known to track, the agents 210a-c may be deployed without causing a significant increase in processing expense by the RAN components 208a-c. Moreover, the agents 210a-c may identify specific events of importance without requiring that the RAN components 208a-c modify their configured operations and without requiring a vendor or operator to share data signals that are not already being shared.

The agent manager 218 may update the instructions at any time. For example, as noted above, where additional data signals become available for some reason or another, additional events may be created (e.g., by the event manager 216) and the agent manager 218 may deploy the additional or updated instructions to the respective agents 210a-c on the RAN components 208a-c. In one or more embodiments, this may involve modifying existing instructions. In one or more embodiments, this may involve simply adding new events that the agent should begin tracking.

The agent manager 218 may update instructions on a large scale and across any number of RAN components. For example, the agent manager 218 may provide an update across all agents generally or across agents on specific RAN components on specific RAN sites. In some embodiments, the agent manager 218 deploys instructions (or updates existing instructions) on an agent-by-agent basis. Thus, the agent manager 218 provides scalability in the ability to update large quantities of agents at once while also providing flexibility to selectively update individual agents and/or agents that are deployed on specific types of RAN components (or at specific RAN sites).

The data collection management system 116 may additionally include a data collection manger 220. The data collection manger 220 can collect data received from the RAN components 208a-c (via the agents 210a-c). As noted above, the operational data (e.g., the identification of detected events) can be received in real time as the events are detected. As shown in FIG. 2, the events may be received via event streams 228a-c originating from each of the respective RAN components 208a-c. For example, a first RAN component 208a can provide a first event stream 228a including event indicators as they are observed by the first agent 210a. As further shown, a second RAN component 208b can provide a second event stream 228b including event indicators as they are observed by the second agent 210b. As further shown, a third RAN component 208c can provide a third event stream 228c including event indicators as they are observed by the third agent 210c. As noted above, the data collection manger 220 may receive event indicators from any number of event streams as corresponding agents and associated RAN components detect or otherwise observe occurrence of various events defined by the sets of deployed instructions.

Upon receiving the event streams 228a-c, the data collection manger 220 may maintain a usage record. The usage record may include a count of all events observed over periods of time. For example, to save space and processing power of the edge device(s) 106, the data collection manger 220 may simply increment counts of the various defined events on specific RAN components 208a-c or across the multiple RAN components collectively. In one or more embodiments, the data collection manger 220 maintains an event matrix including a table or matrix of events and associated sites and/or RAN components as well as a running count of detected events indicated within the received event streams 228a-c.

In one or more embodiments, the data collection manger 220 collects or otherwise identifies a variety of tags or other indicators with respect to the collected event data. For example, in connection with each detected event, the data collection manger 220 may identify or receive one or more specific signals that provide additional information or context with respect to the detected event(s). For example, the data collection manger 220 may receive a site identifier (e.g., a RAN site identifier) indicating a particular base station or geographic identifier of the associated event. In one or more embodiments, the data collection manger 220 may receive a device identifier, such as a SIM ID, in connection with each of the detected events to indicate a particular client device associated with the detected event. In one or more embodiments, the event may be tagged with a time stamp that enables the data collection manger 220 to organize or group the received event data into specific time windows.

The data collection management system 116 can use the event data and associated tags (or event metadata) in a variety of ways. In one or more embodiments, the data collection management system 116 may provide the event data and associated metadata to various services on the cloud infrastructure of the cloud computing system. For example, the data collection management system 116 may provide the event matrix including the indicated events and associated tags to an analysis service on the cloud. In one or more embodiments, the data collection management system 116 may cause the event data to be analyzed on the edge device without sending the data onto the internal infrastructure of the cloud.

In addition to generally analyzing the event data, the data collection management system 116 may make any number of observations about network conditions of the cellular network from the event data. For example, in one or more embodiments, the data collection management system 116 may identify specific trends or groupings of failures to determine commonalities between the various failures. This may involve determining that bandwidth is limited over certain periods of time, which may cause the data collection management system 116 to determine that additional capacity needs to be activated for a given base station or RAN component. This may involve determining that specific RAN components are underperforming and need maintenance. This may involve identifying specific geographic locations where specific client devices (or specific brands of client devices) are failing, which may similarly point to different mitigation acts to perform to improve overall cellular performance.

This collection and analysis of the event data and associated metadata provides a significant improvement over conventional data tracking systems employed on conventional RANs. For instance, conventional systems often fail to provide any information about specific RAN components that are causing network failures or other network irregularities. Moreover, where RAN components may track data locally, there is often very little sharing of data between RAN sites and/or between respective RAN components in a way that allows anyone to know exactly why calls are being dropped or why certain geographic areas or different time periods have lower network performance. The features and functionalities of the data collection management system 116, therefore, provide a significant improvement over conventional systems in that the data collection management system 116 may identify specific devices or components that are failing, as well as the specific timing of the failures and, in some instances, the specific client devices that are associated with the different levels of performance.

As discussed above, and as further shown in FIG. 2, the edge device(s) 106 may optionally include a RAN component 222 having an agent 224 deployed thereon. The RAN component 222 and associated agent 224 may provide similar features and functionality as the other RAN components 208a-c and associated agents 210a-c, such as providing an event stream with an indication of detected events and associated event data to the data collection management system 116. Nevertheless, where the RAN components 208a-c on the RAN site 204 may refer to physical RAN components, the RAN component 222 implemented on the edge device(s) 106 may refer to a virtualized service or application deployed on the cloud computing system rather than at a RAN site.

As shown in FIG. 2, the edge device(s) 206 may include a data storage 226. The data storage 226 may include a variety of data and other information maintained thereon.

The data in the data storage 226 may be accessible to any or all of the components of the data collection management system 116 described above. In one or more embodiments, the data storage 226 is local to the edge device(s) 206. In one or more embodiments, the data storage 226 is located elsewhere (e.g., on the cloud) and simply accessible to components of the data collection management system 116.

As shown in FIG. 2, the data storage 226 may include different types of data. In one or more embodiments the data storage 226 includes RAN data. The RAN data may include any information about the RAN including information about respective RAN sites (e.g., geographic location, hardware data, operator data, etc.) The RAN data may further include information about the respective RAN components, including an identification of a RAN component type, capabilities of the respective RAN components, an identification of the data signals tracked by the RAN components, and any other information known about the different RAN components. Indeed, the RAN data may include any data usable by components of the data collection management system 116 to determine the data signals as well as associate the tracked event data with the corresponding RAN components.

As further shown in FIG. 2, the data storage 226 may include event data. The event data may include any information about the data signals and corresponding event definitions that may be used by the agents to detect instances of various network events. For example, the event data may include identified sets of data signals that each of the RAN components are configured to track. The event data may additionally include any combinations of data signals that constitute events as well as any threshold or ranges of measurable values that trigger identification of any particular event.

Figure 3:
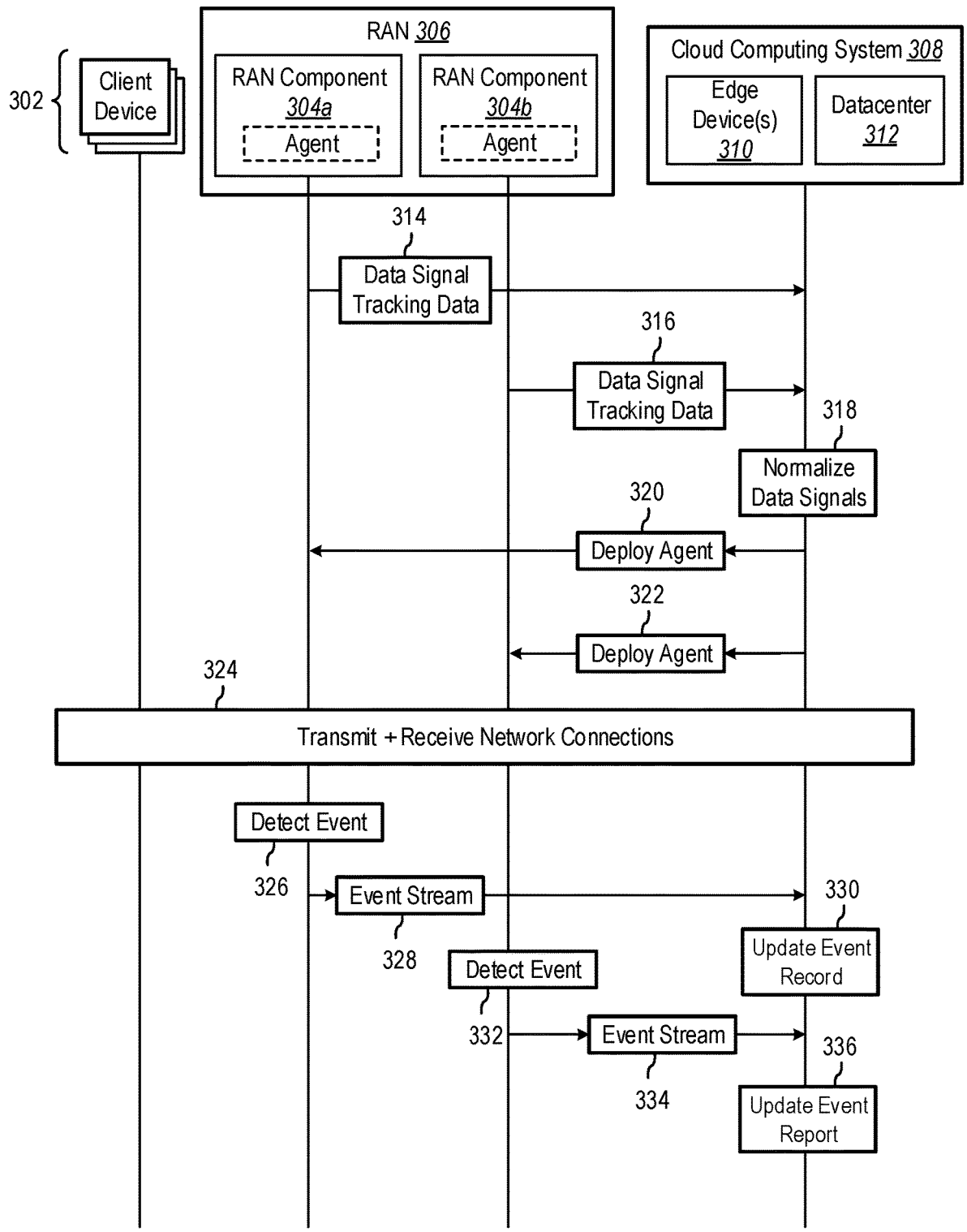
FIG. 3 illustrates an example set of interactions between components of a cellular network for collecting operational data of RAN components in accordance with one or more embodiments.

Additional information will now be discussed in connection with a series of interactions between devices and systems described above that include similar features and functionality as the component discussed above in connection with FIG. 1-2. For example, FIG. 3 illustrates an example series of acts and interactions between client devices, RAN components, and devices of a cloud computing system in connection with collecting operational data for respective components of a RAN. In particular, as shown in FIG. 3, the illustrated environment may include a plurality of client devices 302, first and second RAN components 304a-b of a RAN 306, and a cloud computing system 308 including edge device(s) 310 and a datacenter 312.

As shown in FIG. 3, a first RAN component 304a may perform an act 314 of providing data signal tracking data to a data collection management system (e.g., a data collection management system 116) on a cloud computing system 308. As noted above, the data collection management system may be implemented on one or across one or more edge device(s) 310 and/or a datacenter 312 of the cloud computing system 308. As further shown, a second RAN component 304b may perform an act 316 of providing data signal tracking data to the data collection management system.

As discussed above, the data signal tracking data may be provided to the data collection management system in a number of ways. For example, in one or more embodiments, the RAN components 304a-b may have discoverable or readable data indicating the data signals that the respective RAN components 304a-b are configured to locally track. In one or more embodiments, the RAN components 304a-b broadcast or publish the data signal tracking data. In one or more embodiments, the data collection management system requests and receives the data signal tracking data after authentication or authorization of the data collection management system by a vendor or operator of the RAN components 304a-b.

In one or more embodiments, the data signal tracking data may differ between the respective RAN components 304a-b. For example, the data signal tracking data may indicate different data signals that the respective RAN components 304a-b are configured to track. In some instances, the data signals are similar, but have slightly different protocols or identifiers that are non-uniform between the respective components. In the illustrated example, the data collection management system may compensate for the differences in the data signal tracking data by performing an act 318 of normalizing the data signals. For example, the data collection management system may identify similar types of data signals and associate them with one another for the sake of identifying events and storing the event data from different components in the same data record.

As a non-limiting example, where first data signal tracking data (e.g., tracking data for a first RAN component) may indicate a type of data signal as being associated with mobile devices while second data signal tracking data (e.g., tracking data for a second RAN component) may indicate a type of data signal as being associated with electronic devices generally, the data collection management system may normalize the data by associating the data signals from the respective RAN components as being associated with a broader category of endpoint devices. This normalization enables the data collection management system to generate event instructions that are capable of identifying similar types of endpoint related events at different RAN components, even where those RAN components track data signals having different identifiers associated therewith.

As shown in FIG. 3, the data collection management system may perform an act 320 of deploying an agent on the first RAN component 304a. The data collection management system may additionally perform an act 322 of deploying an agent on the second RAN component 304b. The agents may refer to software agents or configurable interfaces that can be deployed on the RAN components 304a-b. As discussed above, the agents may observe the data signals that are tracked by the respective RAN components 304a-b and detect events that are defined based on the data signal tracking data previously provided to the data collection management system. In one or more embodiments, the agents observe the tracked data signals and detect the defined events without interrupting normal operation of the RAN components 304a-b. Indeed, the agents may simply observe data signals that the RAN components 304a-b are already configured to track (and which the RAN components 304a-b have published the pre-configuration to track) and do not affect the specific data signals that the RAN components 304a-b track in any way.

In accordance with one or more embodiments described herein, deployment of the agents may involve the initial deployment of the agents on the RAN components as well as any updates of the agents via updated event detection instructions. For example, as additional types of data signals become available or as new definitions of events become available, the data collection management system may deploy additional instructions (or update existing instructions) on the agents to detect additional events. Further information in connection with updating event detection instructions on the agents will be discussed below in connection with FIGS. 4A-4B.

As shown in FIG. 3, the client devices 302, RAN components 304a-b, and cloud computing system 308 may conduct normal operations within the illustrated environment. Indeed, the components of the environment may collectively perform an act 324 of transmitting and receiving network communications to and from the respective components. This may involve calls and other communications originating from the client devices 302 via the RAN 306 as well as communications that are being communicated to the respective client devices 302.

As further shown, the first RAN component 304a may perform an act 326 of detecting an event (e.g., any event defined by a set of instructions deployed on the agent). In response to detecting the event, the RAN component 304a may perform an act 328 of providing an indication of the event via an event stream. By providing the event indications via the event stream, the data collection management system may receive indications of detected events in real-time as they are detected. As shown in FIG. 3, upon receiving the indication of the detected event, the data collection management system may perform an act 330 of updating an event record to include the indicated event. This may involve updating a count of observed events. This may include adding additional data associated with the detected event(s) to the event record.

In addition to the indication of the event(s), the event stream may include tags or other event metadata tracked by the RAN components 304a including, by way of example, an identifier of the client device(s) involved in a communication, a site identifier of the RAN 306, a timestamp of the communication, an identifier of the RAN component 304a, and any other information that is obtainable by the agent when observing the data signals that trigger detection of the event. As noted above, this additional information (e.g., event metadata) can be added to the event record.

As shown in FIG. 3, the second RAN component 304b may perform an act 332 of detecting an event. In response to detecting the event, the second RAN component 304b may perform an act 334 of providing an indication of the detected event within an event stream. Upon receiving the indication of the detected event, the data collection management system may perform an act 336 of updating the event record. The acts 332-336 associated with detecting the event(s) by the agent on the second RAN component 304b may include similar features as discussed above in connection with similar acts 326-330 in connection with events detected by an agent on the first RAN component 304a.

Figure 4A:
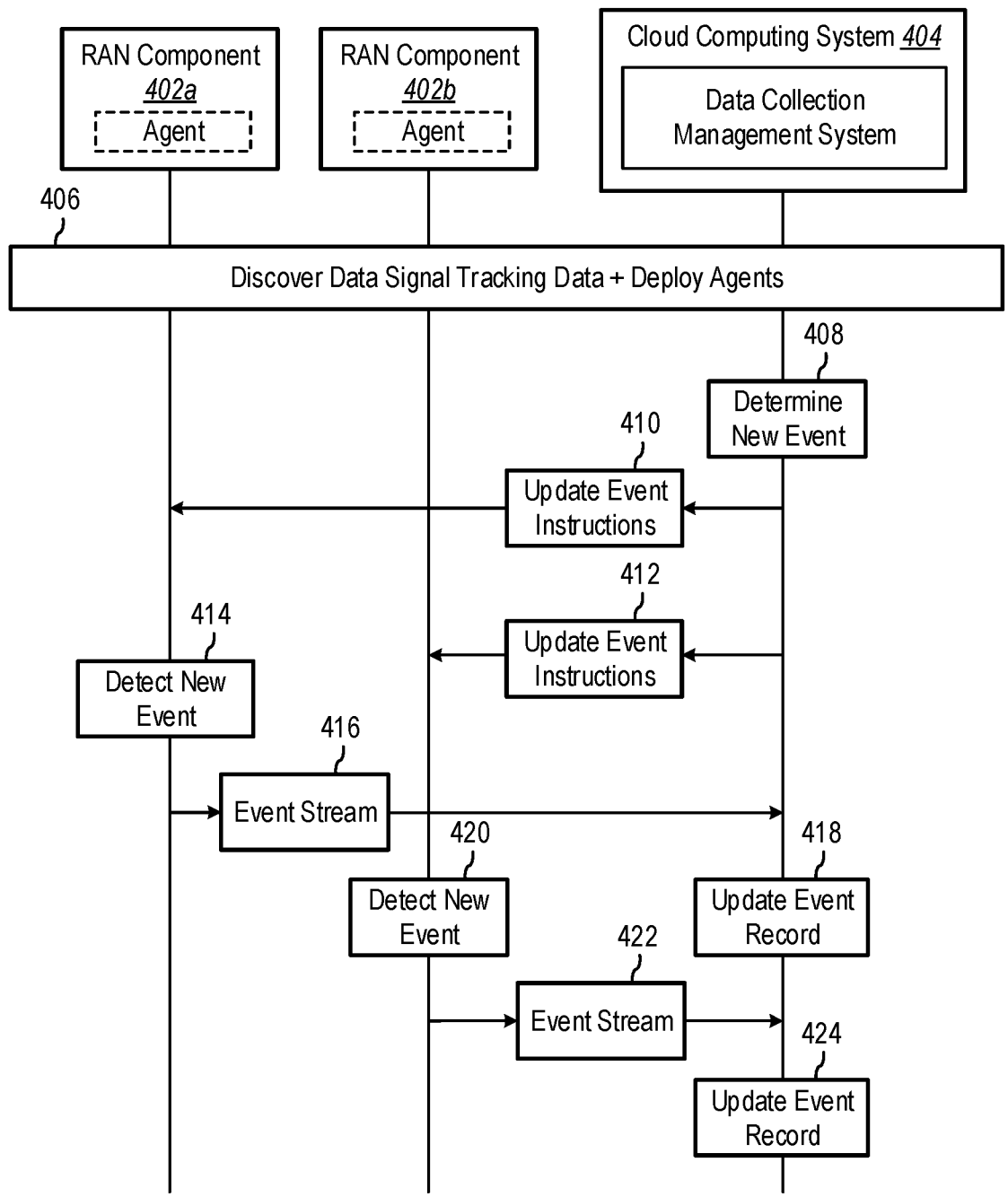
FIG. 4A illustrates an example implementation in which a new event is determined and instructions are updated on agents across a plurality of RAN components.
Figure 4B:
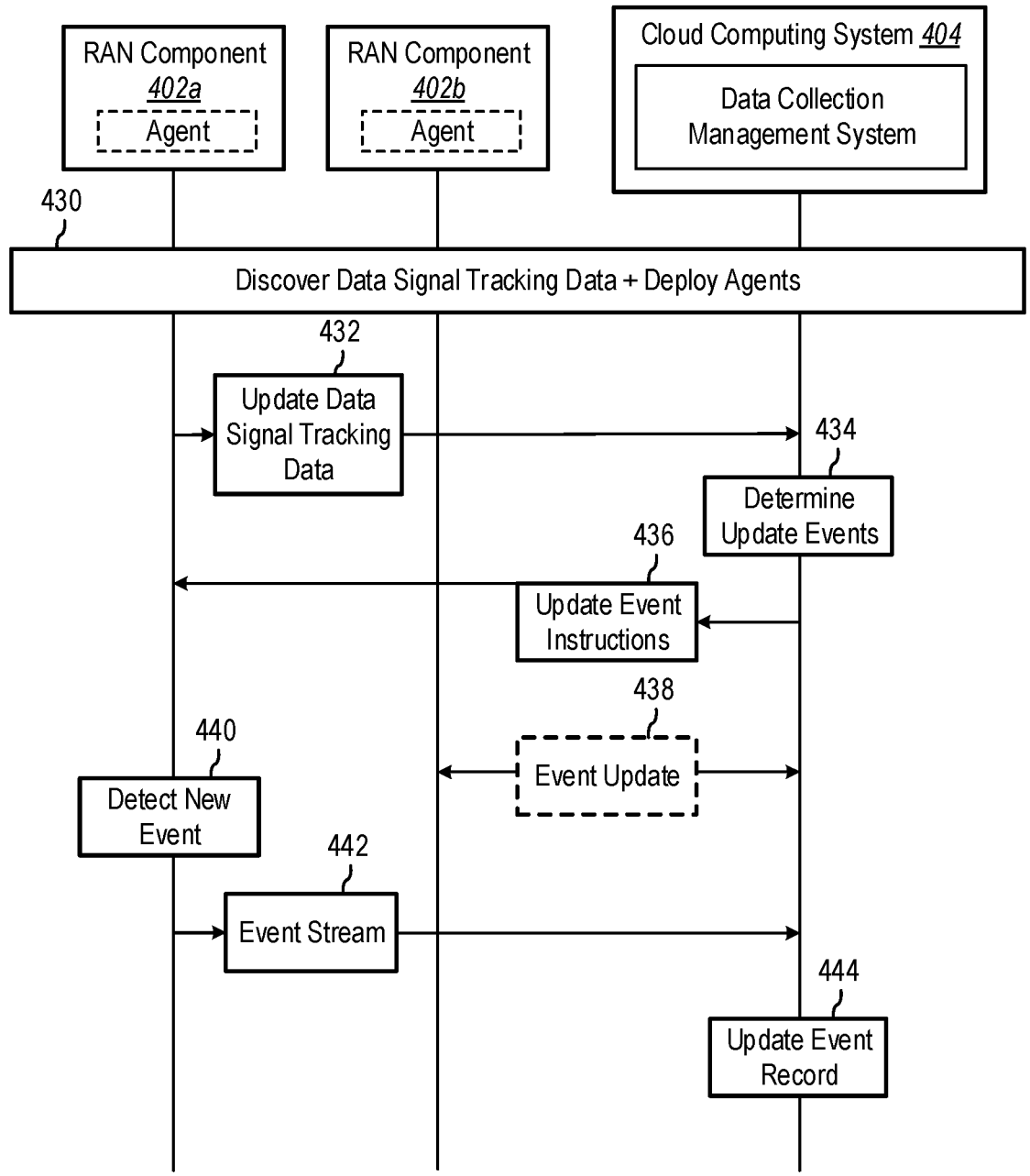
FIG. 4B illustrates an example implementation in which a set of data signals are updated and an event is updated based on the set of data signals.

FIG. 4A-4B illustrates example implementations in which the types of events detectable by the deployed agents can be updated. For example, FIG. 4A illustrates an example implementation that involves updating events detected by a set of RAN components based on a new event determined or otherwise identified by a data collection management system. As shown in FIG. 4A, the implementation includes a first RAN component 402a having an agent thereon, a second RAN component 402b having an agent thereon, and a cloud computing system 404 having the data collection management system implemented thereon.

As shown in FIG. 4A, the RAN components 402a-b and the cloud computing system 404 may collectively perform an act 406 of discovering data signal tracking data and deploying agents on the RAN components 402a-b. This act 406 may include similar features and functionality as acts 314-322 described above in connection with FIG. 3. Indeed, this act 406 may include the discovery of data signal tracking data for each of the RAN components 402a-b, determining any number of events that may be tracked based on the data signal tracking data, and deploying the agents and associated event detection instructions on the respective RAN components 402a-b.

As noted above, in one or more embodiments, the data collection management system may receive, identify, or otherwise determine new events based on a variety of factors. In this example, the data collection management system may perform an act 408 of determining a new event. This new event may be based on a particular combination of already available data signals. In one or more embodiments, the data collection management system receives data for defining the new event based on observations of RAN operators or analysis of previously received event data. For example, the new event may be determined based on observed trends of communication failures at various RAN sites.

As shown in FIG. 4A, the data collection management system may perform an act 410 of updating the event instructions on the first RAN component 402a. The data collection management system may additionally perform an act 412 of updating the event instructions on the second RAN component 402b. This update of the event instructions may involve simply distributing the same set of instructions to the respective RAN components 402a-b, thus providing a very scalable approach to updating agents that are deployed across a wide range of RANs. In one or more embodiments, the updated instructions may differ between the respective RAN components 402a-b (e.g., where the associated set of data signals are different between the respective RAN components 402a-b).

As shown in FIG. 4A, the agent on the first RAN component 402a can perform an act 414 of detecting the new event associated with the updated event instructions. Upon detecting the event, the agent on the first RAN component 402a can perform an act 416 of providing an indication of the detected event via a first event stream. Upon receiving the indicated occurrence of the new event via the event stream, the data collection management system may perform an act 418 of updating an event record.

As further shown, the agent on the second RAN component 402b can perform an act 420 of detecting the new event associated with the updated event instructions. Upon detecting the event, the agent on the second RAN component 402b can perform an act 422 of providing an indication of the detected event via a second event stream. Upon receiving the indicated occurrence of the new event via the event stream, the data collection management system may perform an act 424 of updating the event record. The acts 414-424 of detecting the events, providing indications of the detected events and updating the event record may include similar features as corresponding acts 326-336 described above in connection with FIG. 3.

While FIG. 4A illustrates an example in which a new event is determined and corresponding event instructions are deployed based on receiving or locally determining the new event, FIG. 4B illustrates an example in which a new event is determined based on an update of data signals tracked by one or more of the RAN components. For example, where a RAN component is updated or replaced with newer hardware or updated software, additional data signals may be tracked by the updated or replaced RAN component. In this new environment, the data collection management system may be able to leverage the additional capabilities of the RAN component in a variety of ways, with FIG. 4B illustrating one possible example. Indeed, the acts described in FIG. 4B may be performed in combination with or as an alternative to the acts described in FIG. 4A (e.g., in the same or in separate embodiments).

For example, as shown in FIG. 4B, the RAN components 402a-b and the cloud computing system 404 may perform an act 430 of discovering data signal tracking data and deploying agents. This act 430 may be similar to the act 406 described in connection with FIG. 4B.

As further shown, the first RAN component 402a may perform an act 432 of providing updated data signal tracking data to the data collection management system. This update of the data signal tracking data may occur for a variety of reasons. For example, in one or more embodiments, the data signal tracking data may be updated based on new hardware installed at a RAN location. In one or more embodiments, the data signal tracking data may be updated based on an update to software or hardware at the RAN location. In one or more embodiments, the data signal tracking data may be updated as a matter of preference or permission indicated by an operator of the RAN. In one or more embodiments, the updated data signal tracking data may be provided in response to a specific request for additional data signal tracking data from the data collection management system.

In response to receiving the updated data signal tracking data, the data collection management system may perform an act 434 of determining updated event(s). For example, based on additional data signals, the data collection management system may determine any number of additional events that may be tracked by an agent on the first RAN component 402a. As shown in FIG. 4B, the data collection management system may then perform an act 436 of updating the event instructions on the agent of the first RAN component 402a. In accordance with example described herein, this may involve providing additional event instructions or modifying existing instructions on the agent of the RAN component 402a.

While this example shows that only the first agent on the first RAN component 402a is updated based on the updated data signal tracking data, in one or more embodiments, the data collection management system may perform an act 438 of initiating an event update with the second RAN component 402b. For example, in one or more embodiments, the data collection management system may provide an indication of additional data signal tracking data that has been made available of other RAN components that are similar to the second RAN component 402b. In this way, the data collection management system may prompt the second RAN component 402b to provide any additional data signals that the RAN component 402b is configured to track. Nevertheless, this is optional and, in some instances, the second RAN component 402b may not provide an updated set of tracking capabilities similar to the first RAN component 402a.

As shown in FIG. 4B, the agent on the first RAN component 402a may perform an act 440 of detecting a new event. Based on detecting the new event, the agent on the first RAN component 402a may perform an act 442 of providing an indication of occurrence of the new event via an event stream. Upon receiving the indication that the new event has been detected, the data collection management system may perform an act 444 of updating an event record.

Figure 5:
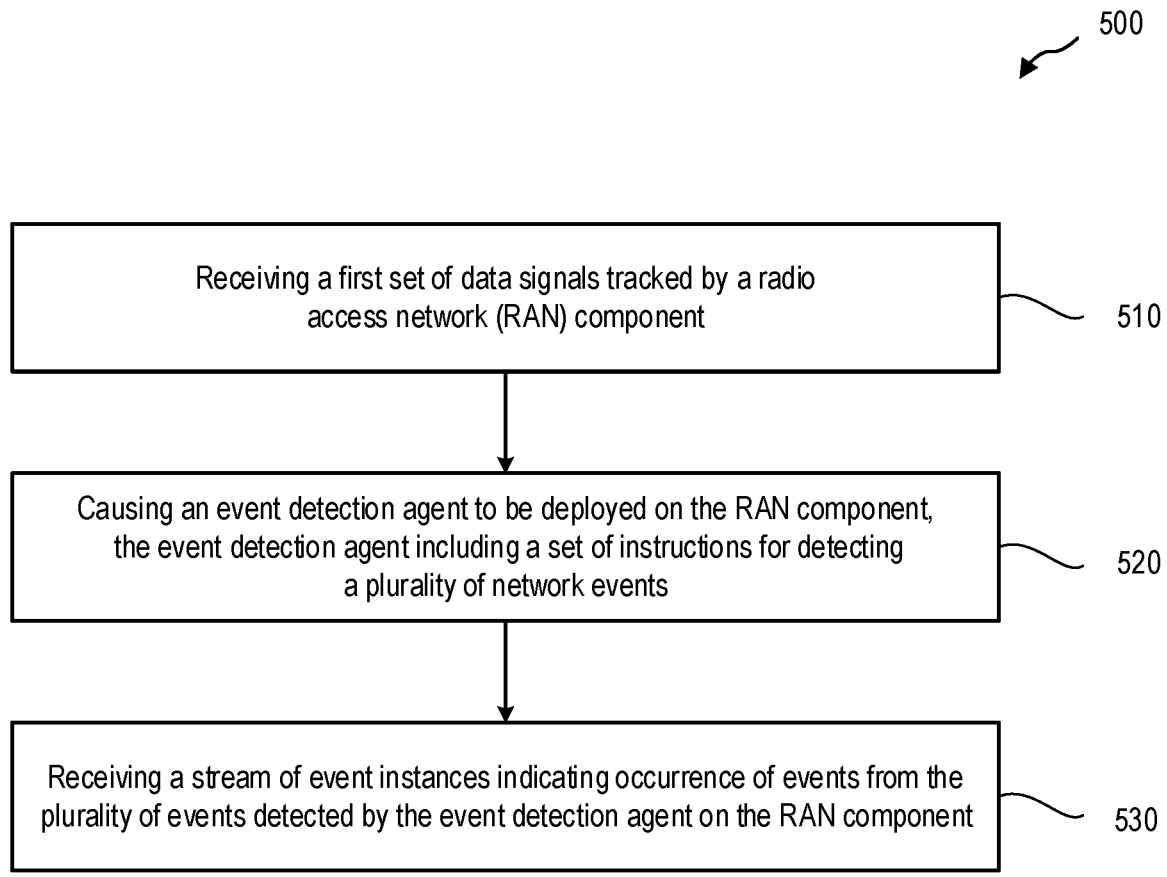
FIG. 5 illustrates a series of acts for implementing a data collection agent for collecting operational data on a RAN component in accordance with one or more embodiments.

Turning now to FIG. 5, this figure illustrates an example flowchart including a series of acts for implementing features and functionalities described herein. While FIG. 5 illustrates acts according to one or more embodiments, alternative embodiments may omit, add to reorder, and/or modify any of the acts shown in FIG. 5. The acts of FIG. 5 may be performed as part of a method. Alternatively, a non-transitory computer-readable medium can include instructions thereon that, when executed by one or more processors, cause a server device and/or client device to perform the acts of FIG. 5. In still further embodiments, a system can perform the acts of FIG. 5.

FIG. 5 illustrates an example series of acts 500 for collecting operational data across a plurality of RAN components. As shown in FIG. 5, the series of acts 500 may include an act 510 of receiving a first set of data signals tracked by a RAN component. In one or more embodiments, the act 510 involves receiving, from a first RAN component, a first set of data signals tracked by the first RAN component.

As further shown, the series of acts 500 may include an act 520 of causing an event detection agent to be deployed on the RAN component, the event detection agent including a set of instructions for detecting a plurality of network events. In one or more embodiments, the act 520 involves causing an event detection agent to be deployed on the first RAN component, wherein the event detection agent includes a set of instructions for detecting a first plurality of events based on one or more data signals from the first set of data signals.

As further shown, the series of acts 500 may include an act 530 of receiving a stream of event instances indicating occurrence of events from the plurality of events detected by the event detection agent on the RAN component. In one or more embodiments, the act 530 involves receiving, from the first RAN component via the event detection agent, a first stream of event instances indicating occurrence of events from the plurality of events locally detected by the event detection agent in accordance with the set of instructions.

In one or more embodiments, the first RAN component is implemented on a base station being operated independently from a cloud computing system. In one or more embodiments, the first RAN component is a virtualized RAN component hosted on a cloud computing system. In one or more embodiments, the first RAN component is a virtualized RAN component hosted on an edge network device of the cloud computing system where the edge network device being hosted off-site from a datacenter of the cloud computing system.

In one or more embodiments, the series of acts 500 may further include receiving, from a second RAN component, a second set of data signals tracked by the second RAN component. The series of acts 500 also include causing a second event detection agent to be deployed on the second RAN component. The second event detection agent may include a second set of instructions for detecting a second plurality of events based on one or more data signals from the second set of data signals. The series of acts 500 may further include receiving, from the second RAN component via the second event detection agent, a second stream of event instances indicating occurrence of events from the second plurality of events locally detected by the second event detection agent in accordance with the second set of instructions.

In one or more embodiments, the series of acts 500 includes normalizing the first set of data signals and the second set of data signals to determine a common plurality of events between the first plurality of events and the second plurality of events. In one or more embodiments, the first stream of event instances and the second stream of event instances include events of similar types based on normalization of the first set of data signals and the second set of data signals. In one or more embodiments, the first plurality of events includes one or more different types of events than the second plurality of events based on differences in data signals between the first set of data signals and the second set of data signals. In one or more embodiments, the first RAN component is located at a first site and operated by a first vendor while the second RAN component is located at a second site and operated by a second vendor.

In one or more embodiments, the series of acts 500 includes receiving, from the first RAN component, a new data signal tracked by the first RAN component. The series of acts 500 may also include determining a new event based on availability of the new data signal received from the first RAN component. The series of acts 500 may further include updating the set of instructions on the event detection agent to detect the new event in addition to the first plurality of events.

In one or more embodiments, the series of acts 500 includes determining a new event based on a combination of data signals from the set of data signals. In one or more embodiments, the series of acts 500 includes updating the plurality of events to include the new event by providing updating instructions to the event detection agent. Providing the updated instructions may cause the event detection agent to begin detecting instances of the new event and including the detected instances of the new event within the first stream of event instances.

In one or more embodiments, the series of acts 500 includes accumulating a record of event instances over a predetermined period of time based the first stream of event instances. In one or more embodiments, the series of acts 500 includes storing the record of event instances on a storage service of a cloud computing system. The series of acts 500 may also include analyzing the record of event instances to determine a health status of the first RAN component.

Figure 6:
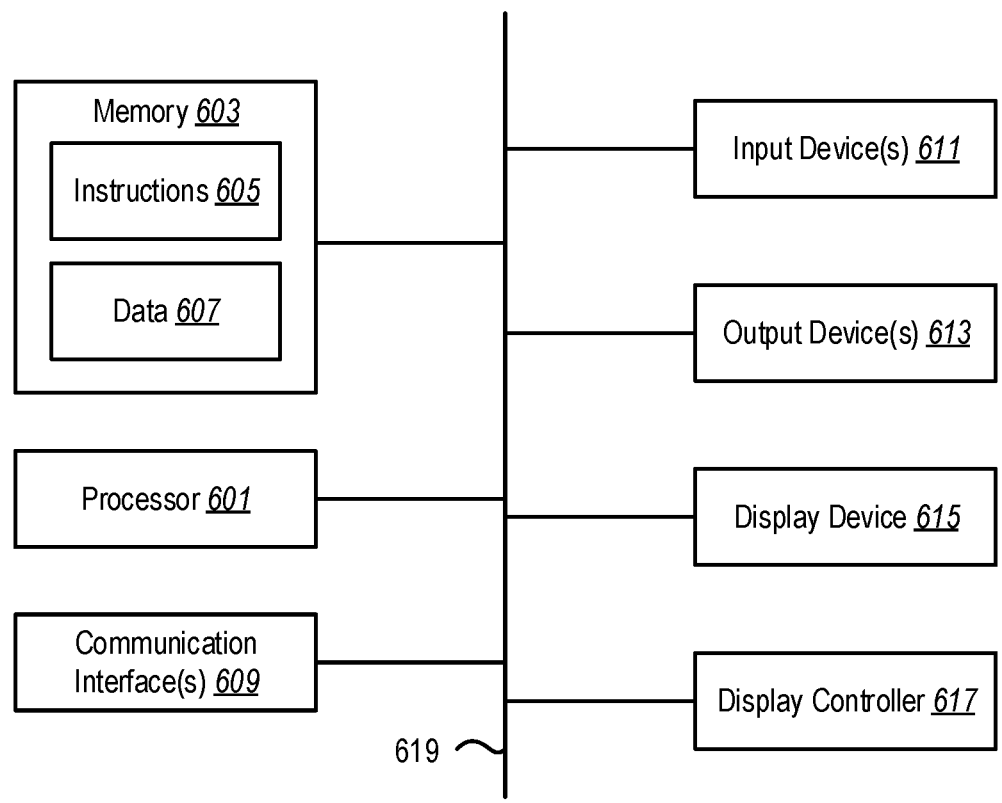
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for collecting operational data across at least one radio access network (RAN) component, the method comprising:

receiving, from a first RAN component, a first set of data signals tracked by the first RAN component;

causing an event detection agent to be deployed on the first RAN component, wherein the event detection agent includes a set of instructions for detecting a first plurality of events based on one or more data signals from the first set of data signals;

receiving, from the first RAN component via the event detection agent, a first stream of event instances indicating occurrence of events from the first plurality of events locally detected by the event detection agent in accordance with the set of instructions;

storing a record of event instances based on the first stream of event instances, the record of event instances being stored on a storage service of a cloud computing system; and analyzing the record of event instances to determine a health status of the first RAN component.

2. The method of claim 1, wherein the first RAN component is implemented on a base station being operated independently from a cloud computing system.

3. The method of claim 1, wherein the first RAN component is a virtualized RAN component hosted on a cloud computing system.

4. The method of claim 3, wherein the first RAN component is hosted on an edge network device of the cloud computing system, the edge network device being hosted off-site from a datacenter of the cloud computing system.

5. The method of claim 1, further comprising:
receiving, from a second RAN component, a second set of data signals tracked by the second RAN component;
causing a second event detection agent to be deployed on the second RAN component, wherein the second event detection agent includes a second set of instructions for detecting a second plurality of events based on one or more data signals from the second set of data signals; and
receiving, from the second RAN component via the second event detection agent, a second stream of event instances indicating occurrence of events from the second plurality of events locally detected by the second event detection agent in accordance with the second set of instructions.

6. The method of claim 5, further comprising normalizing the first set of data signals and the second set of data signals to determine a common plurality of events between the first plurality of events and the second plurality of events, wherein the first stream of event instances and the second stream of event instances include a same type of defined event based on normalization of the first set of data signals and the second set of data signals.

7. The method of claim 5, wherein the first plurality of events includes one or more different types of events than the second plurality of events based on differences in data signals between the first set of data signals and the second set of data signals.

8. The method of claim 5, wherein the first RAN component is located at a first site and operated by a first vendor, and wherein the second RAN component is located at a second site and operated by a second vendor.

9. The method of claim 1, further comprising:
receiving, from the first RAN component, a new data signal tracked by the first RAN component;
determining a new event based on availability of the new data signal received from the first RAN component; and
updating the set of instructions on the event detection agent to detect the new event in addition to the first plurality of events.

10. The method of claim 1, further comprising:
determining a new event based on a combination of data signals from the set of data signals; and
updating the first plurality of events to include the new event by providing updated instructions to the event detection agent, wherein providing the updated instructions causes the event detection agent to begin detecting instances of the new event and including the detected instances of the new event within the first stream of event instances.

11. The method of claim 1, further comprising accumulating a record of event instances over a predetermined period of time based on the first stream of event instances.

12. A system for collecting operational data across a plurality of radio access network (RAN) components, the system comprising:
at least one processor;
memory in electronic communication with the at least one processor; and
instructions stored in the memory, the instructions being executable by the at least one processor to:
receive, from a first RAN component, a first set of data signals tracked by the first RAN component;
cause an event detection agent to be deployed on the first RAN component, wherein the event detection agent includes a set of instructions for detecting a first plurality of events based on one or more data signals from the first set of data signals;
receive, from the first RAN component via the event detection agent, a first stream of event instances indicating occurrence of events from the first plurality of events locally detected by the event detection agent in accordance with the set of instructions;
store a record of event instances based on the first stream of event instances, the record of event instances being stored on a storage service of a cloud computing system; and
analyze the record of event instances to determine a health status of the first RAN component.

13. The system of claim 12, wherein the first RAN component is one or more of:
a component implemented on a base station being operated independently from a cloud computing system; or
a virtualized RAN component hosted on the cloud computing system.

14. The system of claim 12, the instructions further being executable by the at least one processor to:
receive, from a second RAN component, a second set of data signals tracked by the second RAN component;
cause a second event detection agent to be deployed on the second RAN component, wherein the second event detection agent includes a second set of instructions for detecting a second plurality of events based on one or more data signals from the second set of data signals; and
receive, from the second RAN component via the second event detection agent, a second stream of event instances indicating occurrence of events from the second plurality of events locally detected by the second event detection agent in accordance with the second set of instructions.

15. The system of claim 14, the instructions further being executable by the at least one processor to normalize the first set of data signals and the second set of data signals to determine a common plurality of events between the first plurality of events and the second plurality of events, wherein the first stream of event instances and the second stream of event instances include a same type of defined event based on normalization of the first set of data signals and the second set of data signals.

16. The system of claim 12, the instructions further being executable by the at least one processor to:
receive, from the first RAN component, a new data signal tracked by the first RAN component;
determine a new event based on availability of the new data signal tracked by the first RAN component; and
update the set of instructions on the event detection agent to detect the new event in addition to the first plurality of events.

17. The system of claim 12, the instructions further being executable by the at least one processor to:
determine a new event based on a combination of data signals from the set of data signals; and
update the first plurality of events to include the new event by providing updating instructions to the event detection agent, wherein providing the updated instructions causes the event detection agent to begin detecting instances of the new event and including the detected instances of the new event within the first stream of event instances.

18. A non-transitory computer-readable medium storing instructions thereon that, when executed by at least one processor, causes a computing device to:
receive, from a first RAN component, a first set of data signals tracked by the first RAN component;
cause an event detection agent to be deployed on the first RAN component, wherein the event detection agent includes a set of instructions for detecting a first plurality of events based on one or more data signals from the first set of data signals;
receive, from the first RAN component via the event detection agent, a first stream of event instances indicating occurrence of events from the first plurality of events locally detected by the event detection agent in accordance with the set of instructions;
store a record of event instances based on the first stream of event instances, the record of event instances being stored on a storage service of a cloud computing system; and
analyze the record of event instances to determine a health status of the first RAN component.

19. The non-transitory computer-readable medium of claim 18, further comprising instructions that, when executed by the at least one processor, causes the computing device to:
receive, from a second RAN component, a second set of data signals tracked by the second RAN component;
cause a second event detection agent to be deployed on the second RAN component, wherein the second event detection agent includes a second set of instructions for detecting a second plurality of events based on one or more data signals from the second set of data signals; and
receive, from the second RAN component via the second event detection agent, a second stream of event instances indicating occurrence of events from the second plurality of events locally detected by the second event detection agent in accordance with the second set of instructions.

20. The non-transitory computer-readable medium of claim 18, wherein the first RAN component is one or more of:
a component implemented on a base station being operated independently from a cloud computing system; or
a virtualized RAN component hosted on the cloud computing system.

* * * * *